United States Patent
Takagi et al.

(10) Patent No.: US 6,499,470 B2
(45) Date of Patent: Dec. 31, 2002

(54) CONTROL SYSTEM FOR INTERNAL COMBUSTION ENGINE

(75) Inventors: Jiro Takagi, Wako (JP); Yasuaki Asaki, Wako (JP); Mikio Fujiwara, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/955,121

(22) Filed: Sep. 19, 2001

(65) Prior Publication Data

US 2002/0035986 A1 Mar. 28, 2002

(30) Foreign Application Priority Data

Sep. 22, 2000 (JP) ........................................ 2000-287868

(51) Int. Cl.⁷ .............................................. F02D 17/02
(52) U.S. Cl. ..................................................... 123/481
(58) Field of Search ............................. 123/198 F, 481

(56) References Cited

U.S. PATENT DOCUMENTS 4,597,370 A * 7/1986 Yasuoka et al. ............. 123/493
5,492,100 A * 2/1996 Ishii et al. ................... 123/481

* cited by examiner

*Primary Examiner*—Gene Mancene
*Assistant Examiner*—Hyder Ali
(74) *Attorney, Agent, or Firm*—Arent Fox Kintner Plotkin & Kahn, PLLC

(57) ABSTRACT

A control system for an internal combustion engine having a plurality of cylinders and a cylinder halting mechanism for halting operation of at least one of the plurality of cylinders. The cylinder halting mechanism is controlled to operate all of the plurality of cylinders or to halt the operation of the at least one of the plurality of cylinders. The operating state of the cylinder halting mechanism is detected based on the amount of change in the detected intake pressure of the engine.

12 Claims, 3 Drawing Sheets

CONTROL SYSTEM FOR INTERNAL COMBUSTION ENGINE

BACKGROUND OF THE INVENTION

The present invention relates to a control system for an internal combustion engine having a plurality of cylinders and a cylinder halting mechanism for halting the operation of some of the plurality of cylinders.

In an internal combustion engine having a cylinder halting mechanism for halting the operation of some of a plurality of cylinders, if fuel is erroneously supplied to a nonoperating cylinder, the amount of fuel supplied into another operating cylinder increases. This makes the air-fuel ratio deviate from a desired value and causes deterioration of the exhaust gas characteristics.

The above-described situation occurs when the cylinders do not actually operate although a control signal for operating all cylinders is supplied from the control system to the cylinder halting mechanism. Therefore, this failure must be detected rapidly. For example, the following method for determining such a failure is disclosed in Japanese Patent Laid-open No. Hei 6-146937. In the method, a discrimination threshold value PMAP corresponding to an intake pressure of the engine, which is operated in the all-cylinder operating mode, is calculated according to the engine speed and the throttle valve opening. If a control signal for operating all cylinders is outputted to the cylinder halting mechanism and the detected intake pressure PB is higher than the discrimination threshold value PMAP, it is determined that some of the cylinders are not actually operating, or in other words, the cylinder halting mechanism is in failure.

However, the intake pressure PB is always changing in response to operation of the intake valve of each cylinder and the difference between the average value of intake pressures detected during all-cylinder operation of the engine and the average value of intake pressures detected during partial-cylinder operation where some of the cylinders are not operating, is small. Therefore, there is a high possibility of erroneously determining that the cylinder halting mechanism is in failure although the mechanism is operating normally.

SUMMARY OF THE INVENTION

It is an object of the present invention to provide a control system for an internal combustion engine which can determine the failure of the cylinder halting mechanism more accurately.

In order to attain the object described above, the present invention provides a control system for an internal combustion engine having a plurality of cylinders and a cylinder halting mechanism for halting operation of some or at least one of the plurality of cylinders. The control system comprises operation instructing means, intake pressure detecting means, and operating state detecting means. The operation instructing means instructs the cylinder halting mechanism to operate all of the plurality of cylinders or to halt the operation of at least one of the plurality of cylinders. The intake pressure detecting means for detects the intake pressure of the engine. The operating state detecting means detects the operating state of the cylinder halting mechanism based on the amount of change (PB3) in the output of the intake pressure detecting means.

With this configuration, the intake pressure of the engine is detected and the operating state of the cylinder halting mechanism is detected based on the amount change in the detected intake pressure. Therefore, a failure of the cylinder halting mechanism can be determined with a higher accuracy when compared with detecting the operating state of the cylinder halting mechanism based on the intake pressure itself.

Preferably, the control system further comprises fuel supply stopping means for stopping the fuel supply to some of the plurality of cylinders, if it is detected by the operating state detecting means that some of the plurality of cylinders are not operating although the operation instructing means instructs the cylinder halting mechanism to operate all of the plurality of cylinders.

With this configuration, the fuel supply to some of the plurality of cylinders is stopped, if it is detected by the operating state detecting means that some of the plurality of cylinders are not operating although the operation instructing means instructs the cylinder halting mechanism to operate all of the plurality of cylinders. Consequently, a situation where the amount of fuel to be supplied to each of the operating cylinders is increased and the air-fuel ratio deviates from its desired value to deteriorate the exhaust gas characteristics, can be avoided.

Preferably, the operating state detecting means determines that some of the plurality of cylinders are not operating when an absolute value (|PB3|) of the amount of change in the detected intake pressure is greater than a predetermined value (PBTH).

Preferably, the intake pressure detecting means detects the intake pressure at a time at which the piston of any cylinder of the plurality of cylinders is positioned in the proximity of the top dead center thereof.

Preferably, the operating state detecting means stores a predetermined number of the amounts of change in the detected intake pressure and detects the operating state of the cylinder halting mechanism based on an average value of the stored amounts of change in the detected intake pressure, the predetermined number being set according to the number of the cylinders (one half of the number of the cylinders).

DETAILED DESCRIPTION OF THE PREFERRED EMBODIMENTS

Hereinafter, preferred embodiments of the present invention will be described with reference to the drawings.

Figure 1:
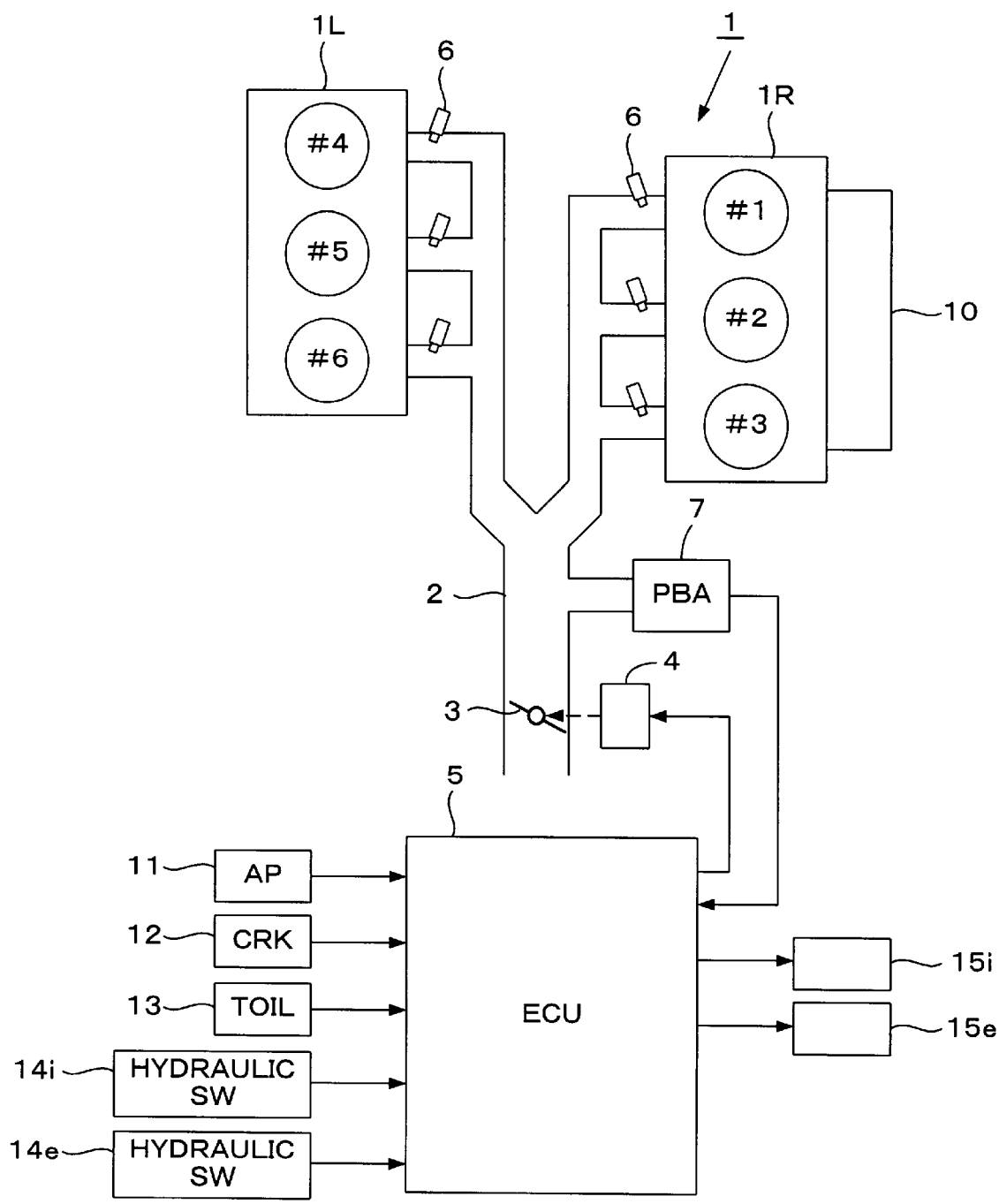
FIG. 1 is a schematic block diagram showing an internal combustion engine and a control system for the internal combustion engine according to an embodiment of the present invention.

FIG. 1 is a schematic block diagram showing an internal combustion engine and a control system for the internal combustion engine according to a preferred embodiment the present invention. A V-type 6-cylinder internal combustion engine (hereinafter referred to merely as "engine") 1 has a right bank 1R on which cylinders #1, #2 and #3 are provided, and a left bank 1L on which cylinders #4, #5 and

Figure 2:
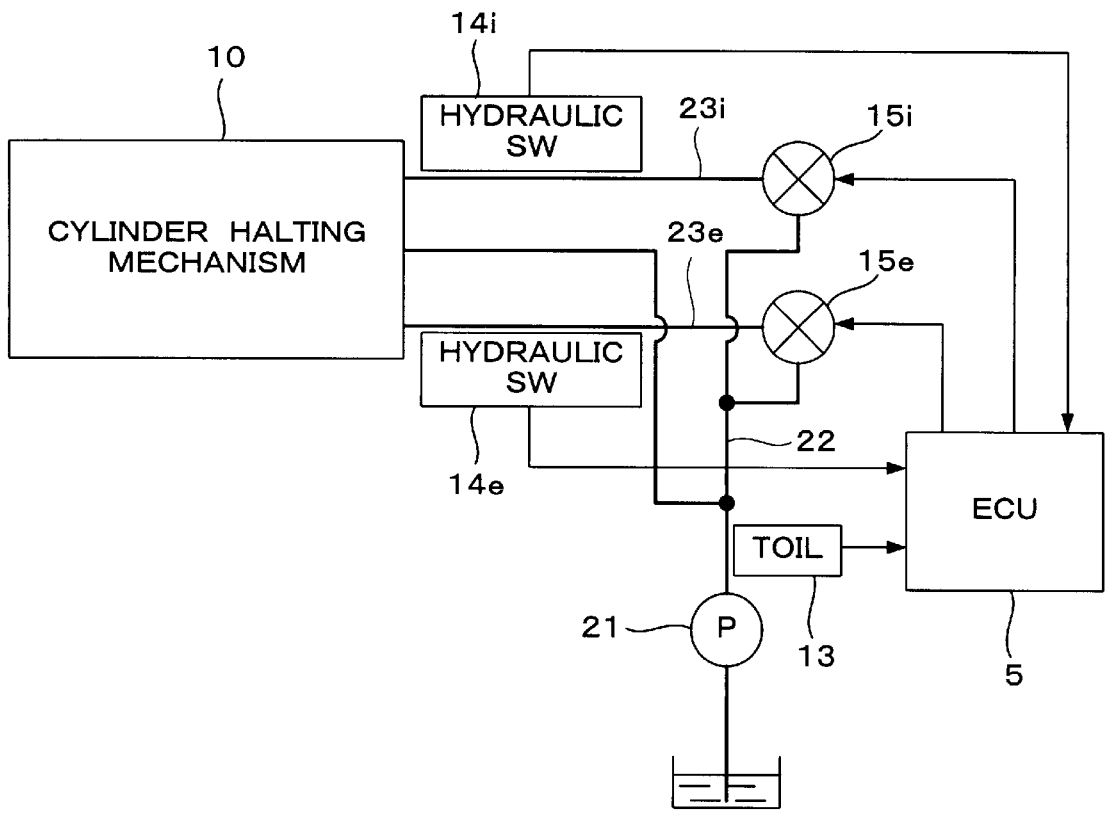
FIG. 2 is a schematic block diagram showing a hydraulic control system for a cylinder halting mechanism of the internal combustion engine.

6 are provided. A cylinder halting mechanism 10 for temporarily halting the operation of the cylinders #1, #2, and #3 is provided for the right bank 1R. FIG. 2 is a hydraulic circuit for hydraulically driving the cylinder halting mechanism 10 and a control system for the hydraulic circuit. In addition to FIG. 1, FIG. 2 is also referred to.

A throttle valve 3 is disposed in an intake pipe 2 of the engine 1. A throttle actuator 4 for driving the throttle valve 3 is connected to the throttle valve 3. The throttle actuator 4 is connected to an electronic control unit (hereinafter referred to as "ECU") 5 for controlling the engine 1.

Fuel injection valves 6, for respective cylinders, are inserted into the intake pipe 2 at locations intermediate between the engine 1 and the throttle valve 3, slightly upstream of respective intake valves (not shown). All the fuel injection valves 6 are connected to a fuel pump (not shown) and electrically connected to the ECU 5. A valve opening period of each fuel injection valve 6 is controlled by a signal from the ECU 5. An absolute intake pressure (PBA) sensor 7 is provided immediately downstream of the throttle valve 3 as intake pressure detecting means for detecting a pressure in the intake pipe 2.

An accelerator opening sensor 11 for detecting the depression amount (hereinafter referred to as "accelerator opening") AP of an accelerator pedal (not shown) of a vehicle driven by the engine 1 and a crank angle position sensor 12 for detecting the crank angle position of the engine 1 are provided. The detection signals of the accelerator opening sensor 11 and the crank angle position sensor 12 are supplied to the ECU 5. It is to be noted that a sensor for detecting the opening of the throttle valve 3, an intake air temperature sensor for detecting the temperature of intake air, a water temperature sensor for detecting a temperature of engine cooling water and other necessary sensors (all of these sensor are not shown) are provided, and detection signals of these sensors are supplied to the ECU 5.

A crank angle position sensor 12 for detecting a rotational angle of the crankshaft (not shown) of the engine 1 is connected to the ECU 5, and a signal corresponding to the detected rotational angle of the crankshaft is supplied to the ECU 5. The crank angle position sensor 11 consists of a cylinder discrimination sensor for outputting a signal pulse at a predetermined crank angle position for a specific cylinder of the engine 1 (this signal pulse will be hereinafter referred to as "CYL signal pulse"). The crank angle position sensor 10 also consists of a TDC sensor for outputting a TDC signal pulse at a crank angle position before a top dead center (TDC) of a predetermined crank angle starting at an intake stroke in each cylinder (at every 120 deg crank angle in the case of a six-cylinder engine), and a CRK sensor for generating one pulse with a constant crank angle period (e.g., a period of 30 deg) shorter than the period of generation of the TDC signal pulse (this pulse will be hereinafter referred to as "CRK signal pulse"). The CYL signal pulse, the TDC signal pulse, and the CRK signal pulse are supplied to the ECU 5. These signal pulses are used to control the various timings, such as fuel injection timing and ignition timing, and for detection of an engine rotational speed NE.

The cylinder halting mechanism 10 is driven hydraulically using lubricating oil of the engine 1 as operating oil. The operating oil pressurized by an oil pump 21 is supplied to the cylinder halting mechanism 10 via an oil passage 22, an intake side oil passage 23i and an exhaust side oil passage 23e. An intake side solenoid valve 15i is provided between the oil passage 22 and the oil passages 23i and an exhaust side solenoid valve 15e is provided between the oil passage 22 and the oil passage 23e. These solenoid valves 15i and 15e are connected to the ECU 5 so that the operation of the solenoid valves 15i and 15e is controlled by the ECU 5.

Hydraulic switches 14i and 14e, which are turned on when the operating oil pressure drops to a pressure which is lower than a predetermined threshold value, are provided respectively for the oil passages 23i and 23e. Detection signals of the hydraulic switches 14i and 14e are supplied to the ECU 5. An operating oil temperature sensor 13 for detecting an operating oil temperature TOIL is provided in the oil passage 22, and a detection signal of the operating oil temperature sensor 13 is supplied to the ECU 5.

An example of specific configuration for the cylinder halting mechanism 10 is disclosed in Japanese Patent Laid-open No. Hei 10-103097, and a mechanism of a similar configuration is used for the cylinder halting mechanism 10. According to this mechanism, when the solenoid valves 15i and 15e are closed and the operating oil pressures in the oil passages 23i and 23e are low, the intake valves and the exhaust valves of the cylinders (#1 to #3) perform normal opening and closing movements. However, when the solenoid valves 15i and 15e are open and the operating oil pressures in the oil passages 23i and 23e are high, the intake valves and the exhaust valves of the cylinders (#1 to #3) maintain their closed state. In other words, while the solenoid valves 15i and 15e are closed, all-cylinder operation of the engine 1 in which all cylinders are operating is performed, and if the solenoid valves 15i and 15e are opened, partial-cylinder operation in which none of the cylinders #1 to #3 are operating is performed.

The ECU 5 includes an input circuit having various functions including a function of shaping the waveforms of input signals from the various sensors, a function of correcting the voltage levels of the input signals to a predetermined level, and a function of converting analog signal values into digital signal values, a central processing unit (which will be hereinafter referred to as "CPU"), a memory circuit consisting of a ROM (read only memory) preliminarily storing various operational programs to be executed by the CPU and a RAM (random access memory) for storing the results of computation or the like by the CPU , and an output circuit 5d for supplying drive signals to the actuator 4, fuel injection valves 6, and so forth. The ECU 5 controls the opening of the throttle valve 3, the opening period of the fuel injection valves 6, the ignition timing and so forth, based on detection signals from the various sensors. The ECU further controls opening and closing of the solenoid valves 15i and 15e to change over the operation of the engine 1 between the all-cylinder operation and the partial-cylinder operation.

Figure 3:
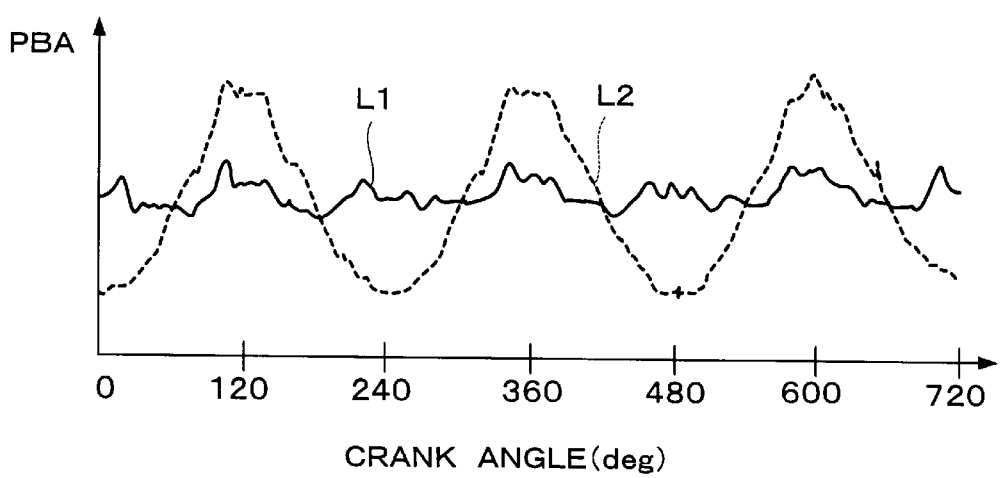
FIG. 3 is a diagram illustrating the variation of the intake pipe internal absolute pressure (PBA) with respect to the crank angle position.

FIG. 3 illustrates a transition of the absolute intake pressure PBA during the all-cylinder operation and the partial-cylinder operation of the engine 1 in the present embodiment. The crank angles 0, 120, 240, 360, 480 and 600 degrees illustrated in FIG. 3 correspond to timings at which the piston of any one of the cylinders is positioned at the top dead center. A solid line L1 of FIG. 3 corresponds to the all-cylinder operation while a broken line L2 corresponds to the partial-cylinder operation of the engine 1. As apparently seen from FIG. 3, the amplitude (difference between the maximum value and the minimum value) of the absolute intake pressure PBA in the partial-cylinder operation is twice or more the amplitude of the absolute intake pressure PBA in the all-cylinder operation. Therefore, in the present embodiment, the operating state of the cylinder halting mechanism 10 is detected in view of the above-described difference in the amplitude of the absolute intake pressure PBA.

Figure 4:
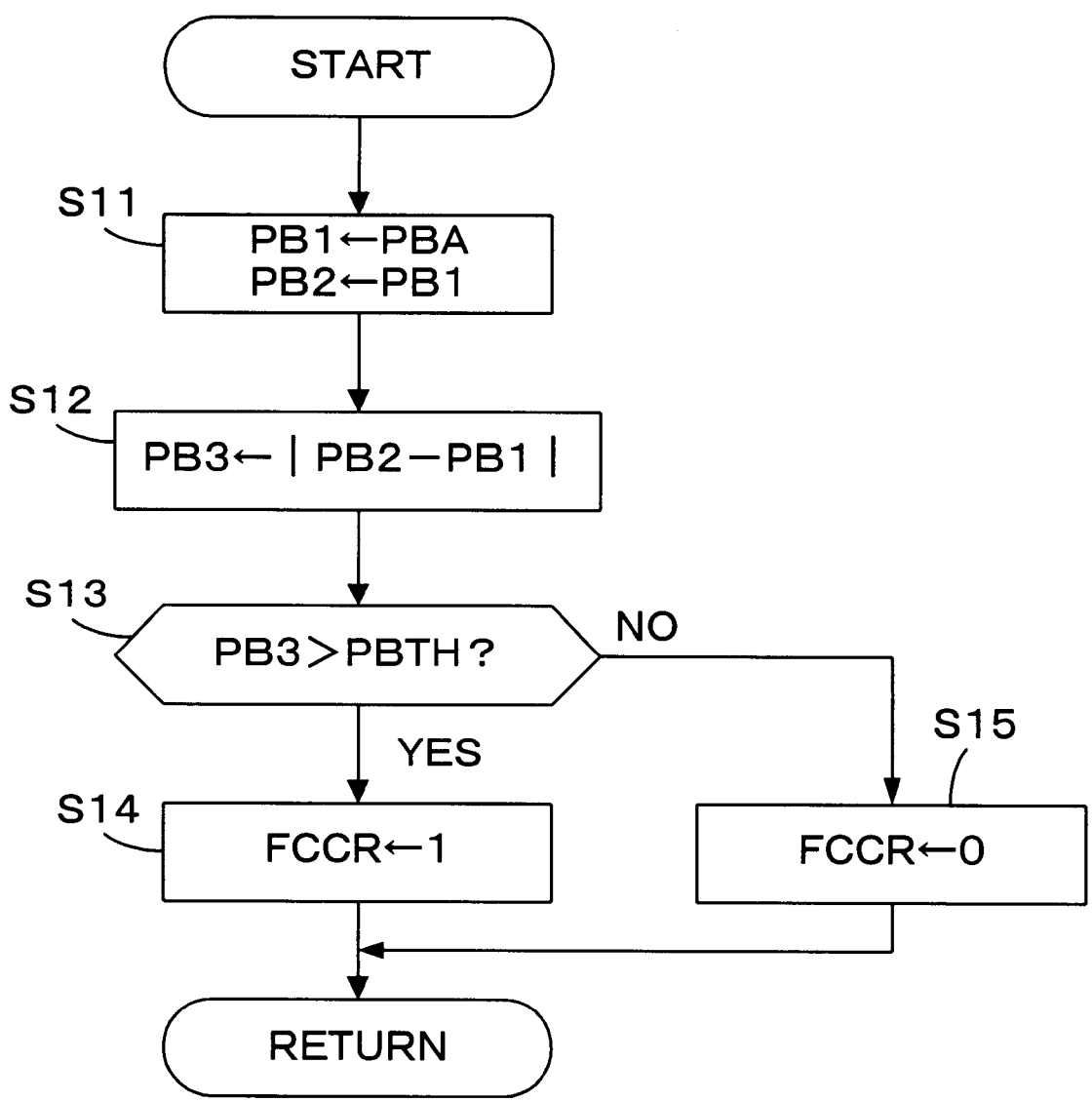
FIG. 4 is a flow chart illustrating a process of determining an operating state of the cylinder halting mechanism.

FIG. 4 is a flow chart showing a process of detecting the operating state of the cylinder halting mechanism 10. This process is executed by the CPU of the ECU 5 at a timing at which the piston of any of the cylinders reaches the top dead center, that is, at the crank angle positions of 0, 120, 240, 360, 480 and 600 degrees of FIG. 3.

In step S11, the absolute intake pressure PBA detected upon the present execution of this process, is stored as a pressure PB1 and another absolute intake pressure PB1 which was stored upon the preceding execution of this process, is stored as another pressure PB2. Then, an absolute value PB3 of a difference between the pressures PB1 and PB2 is calculated (step S12), and it is determined whether or not the absolute value PB3 is greater than a predetermined value PBTH (for example, 670 Pa (5 mmHg)) (step S13). If PB3 is greater than PBTH, it is determined that the engine 1 is in the partial-cylinder operation and a partial-cylinder operation flag FCCR is set to "1" (step S14), which indicates that the partial-cylinder operation is performed. On the other hand, if PB3 is less than or equal to PBTH, it is determined that the engine 1 is in the all-cylinder operation and the partial-cylinder operation flag FCCR is set to "0" (step S15).

If the determination result in the process of FIG. 4 coincides with the control signals outputted from the ECU 5 to the solenoid valves 15$i$ and 15$e$, that is, if it is determined by the process of FIG. 4 that the engine 1 is in the all-cylinder operation while a closing instruction signal is outputted to the solenoid valves 15$i$ and 15$e$, or if it is determined by the process of FIG. 4 that the engine 1 is in the partial-cylinder operation while an opening instruction signal is outputted to the solenoid valves 15$i$ and 15$e$, then the cylinder halting mechanism 10 is determined to be operating normally. Therefore, normal control is continued.

On the other hand, if the ECU 5 outputs a closing instruction signal (a control signal instructing the all-cylinder operation) to the solenoid valves 15$i$ and 15$e$, although it is determined by the process of FIG. 4 that the engine 1 is in the partial-cylinder operation, then it is determined that the cylinder halting mechanism 10 is not operating normally. Consequently, the ECU 5 stops the fuel supply to the cylinders #1, #2 and #3.

As described above, in the present embodiment, the operating state of the cylinder halting mechanism is detected based on the detected amplitude (width of variation) of the absolute intake pressure PBA, in view of the changing characteristic of the absolute intake pressure PBA illustrated in FIG. 3. Therefore, a failure of the cylinder halting mechanism can be determined with a higher accuracy when compared with the case where the absolute intake pressure PBA itself is compared with a determination threshold value to determine a failure.

Further, in the present embodiment, the absolute intake pressure PBA is sampled at a timing at which the piston of any of the cylinders is positioned at the top dead center. Accordingly, when the engine 1 is in the partial-cylinder operation, the above timing is a sample timing at which the absolute value PB3 of the pressure difference theoretically becomes the maximum. When the engine 1 is in the all-cylinder operation, the above timing is a sample timing at which the pressure difference theoretically becomes "0". Therefore, the all-cylinder operation and the partial-cylinder operation can be identified from each other more accurately when compared the case where the operating state of the cylinder halting mechanism is detected from the detected amplitude (difference between the maximum value and the minimum value) of the absolute intake pressure PBA without taking the sample timing into consideration.

Further, if it is determined by the process of FIG. 4 that the engine 1 is in the partial-cylinder operation although the ECU 5 outputs a control signal instructing the all-cylinder operation, then it is determined that the cylinder halting mechanism 10 is not operating normally, and the ECU 5 stops the fuel supply to the cylinders #1, #2 and #3. Consequently, such a situation that the amount of fuel to be supplied to the operating cylinders (4, 5 and 6 cylinders) is increased and the air-fuel ratio deviates from its desired value to deteriorate the exhaust gas characteristics, can be avoided.

In the present embodiment, the ECU 5 constitutes operation instructing means, operating state detecting means and fuel supply stopping means. More specifically, these means are embodied by a computer program executed by the CPU of the ECU 5. The process of FIG. 4 corresponds to the operating state detecting means. The ECU 5 constitutes an operation instructing module, an operating state detecting module and a fuel supply stopping module. More specifically, the process of FIG. 4 corresponds to the operating state detecting module.

In the embodiment described above, the operating state detecting method for a cylinder halting mechanism of the present invention is applied to a six-cylinder engine. The method may be applied similarly to a four-cylinder engine or an eight-cylinder engine. As for the four-cylinder engine, sampling of the absolute intake pressure PBA may be performed every 180 degrees of the crank angle. As for the eight-cylinder engine, sampling of the absolute intake pressure PBA may be performed every 90 degrees of the crank angle. In each case, the sampling is performed at a timing at which a piston of any one cylinder is positioned at the top dead center.

Further, in the embodiment described above, the determination in step S13 of FIG. 4 is executed with regard to the difference between sampled pressure values. The determination in step S13 may be executed using an average value of a predetermined number of detected values obtained by successively sampling the pressure difference PB3. Preferably, the predetermined number is set to a value corresponding to the number of cylinders, that is, one half of the number of cylinders.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A control system for an internal combustion engine having a plurality of cylinders and a cylinder halting mechanism for halting operation of at least one of said plurality of cylinders, said control system comprising:

operation instructing means for instructing said cylinder halting mechanism to operate all of said plurality of cylinders or to halt the operation of at least one of said plurality of cylinders;

intake pressure detecting means for detecting an intake pressure of said engine; and operating state detecting means for detecting an operating state of said cylinder halting mechanism based on the amount of the change in the output of said intake pressure detecting means, wherein said operating state detecting means determines that said at least one of said plurality of cylinders is not operating when the absolute value of the amount of change in the detected intake pressure is greater than a predetermined value.

2. A control system according to claim 1, further comprising fuel supply stopping means for stopping the fuel supply to said at least one of said plurality of cylinders, when said operating state detecting means detects that said at least one of said plurality of cylinders is not operating and said operation instructing means instructs said cylinder halting mechanism to operate all of said plurality of cylinders.

3. A control system according to claim 1, wherein said intake pressure detecting means detects the intake pressure when a piston of any cylinder of said plurality of cylinders is positioned in proximity of the top dead center.

4. A control system according to claim 1, wherein said operating state detecting means stores a predetermined number of the amounts of change in the detected intake pressure and detects the operating state of said cylinder halting mechanism based upon an average value of the stored amounts of change in the detected intake pressure, said predetermined number being set according to the number of said cylinders.

5. A control system for an internal combustion engine having a plurality of cylinders and a cylinder halting mechanism for halting operation of at least one of said plurality of cylinders, said control system comprising:

an operation instructing module for instructing said cylinder halting mechanism to operate all of said plurality of cylinders or to halt the operation of at least one of said plurality of cylinders;

an intake pressure sensor for detecting the intake pressure of said engine; and an operating state detecting module for detecting the operating state of said cylinder halting mechanism based upon the amount of change in the output of said intake pressure sensor, wherein said operating state detecting module determines that said at least one of said plurality of cylinders is not operating when the absolute value of the amount of change in the detected intake pressure is greater than a predetermined value.

6. A control system according to claim 5, further comprising a fuel supply stopping module for stopping the fuel supply to said at least one of said plurality of cylinders, when said operating state detecting module detects that said at least one of said plurality of cylinders is not operating when said operation instructing module instructs said cylinder halting mechanism to operate all of said plurality of cylinders.

7. A control system according to claim 5, wherein said intake pressure sensor detects the intake pressure at a time when a piston of any cylinder of said plurality of cylinders is positioned in proximity to the top dead center.

8. A control system according to claim 5, wherein said operating state detecting module stores a predetermined number of the amounts of change in the detected intake pressure and detects the operating state of said cylinder halting mechanism based upon an average value of the stored amounts of change in the detected intake pressure, said predetermined number being set according to the number of said cylinders.

9. A control method for an internal combustion engine having a plurality of cylinders and a cylinder halting mechanism for halting operation of at least one of said plurality of cylinders, said control method comprising:

a) instructing said cylinder halting mechanism to operate all of said plurality of cylinders or to halt the operation of said at least one of said plurality of cylinders;

b) detecting the intake pressure of said engine; and c) detecting the operating state of said cylinder halting mechanism based upon the amount of change in the detected intake pressure of said engine, wherein it is determined that said at least one of said plurality of cylinders is not operating, when the absolute value of the amount of change in the detected intake pressure is greater than a predetermined value.

10. A control method according to claim 9, further comprising the step of stopping the fuel supply to said at least one of said plurality of cylinders, when it is detected that said at least one of said plurality of cylinders is not operating when said cylinder halting mechanism is instructed to operate all of said plurality of cylinders.

11. A control method according to claim 9, wherein the intake pressure is detected at a time when a piston of any cylinder of said plurality of cylinders is positioned in the proximity of the top dead center.

12. A control method according to claim 9, wherein a predetermined number of the amounts of change in the detected intake pressure is stored and the operating state of said cylinder halting mechanism is detected based upon an average value of the stored amounts of change in the detected intake pressure, said predetermined number being set according to the number of said cylinders.

* * * * *